US008594985B2

(12) United States Patent
Hamann et al.

(10) Patent No.: US 8,594,985 B2
(45) Date of Patent: Nov. 26, 2013

(54) TECHNIQUES FOR DETERMINING PHYSICAL ZONES OF INFLUENCE

(75) Inventors: Hendrik F. Hamann, Yorktown Heights, NY (US); Vanessa Lopez-Marrero, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 13/023,120

(22) Filed: Feb. 8, 2011

(65) Prior Publication Data

US 2012/0203516 A1      Aug. 9, 2012

(51) Int. Cl.
*G06F 17/11* (2006.01)

(52) U.S. Cl.
USPC ........................ 703/9; 703/2; 703/6

(58) Field of Classification Search
None
See application file for complete search history.

(56) References Cited

U.S. PATENT DOCUMENTS

| | | | | |
|---|---|---|---|---|
| 5,923,329 | A * | 7/1999 | Beale | 345/418 |
| 7,366,632 | B2 | 4/2008 | Hamann et al. | |
| 2004/0204926 | A1* | 10/2004 | Neittaanmaki et al. | 703/2 |
| 2008/0288193 | A1 | 11/2008 | Claassen et al. | |
| 2009/0326879 | A1* | 12/2009 | Hamann et al. | 703/2 |
| 2009/0326884 | A1* | 12/2009 | Amemiya et al. | 703/6 |
| 2010/0211370 | A1* | 8/2010 | Maliassov | 703/10 |

OTHER PUBLICATIONS

W. Tschudi et al., "Measuring and Managing Data-Center Energy Use," HPAC Engineering, pp. 45-51 (Mar. 2006).
H.F. Hamann et al., "Uncovering energy-efficiency opportunities in data centers," IBM J. Res. & Dev., vol. 53, No. 3, 10:1-10:12 (2009).
E. Ferrer, et al., "Thermal Zone Mapping: Data Center Visualization Tool for Thermal Metric Analysis," IMAPS ATW (2007).
H.F. Hamann et al., "Thermal zones for more efficient data center energy management," Proceedings of ITHERM2010 (2010).
L.D. Landau et al., "Fluid Mechanics," pp. 14-21 Pergamon Press (1987).
A.N. Brooks et al., "Streamline upwind / Petrov-Galerkin formulations for convection dominated flows with particular emphasis on the incompressible Navier-Stokes equations," Computer Methods in Applied Mechanics and Engineering, vol. 32, pp. 199-259 (1982).
C. Johnson, Numerical Solution of Partial Differential Equations by the Finite Element Method, pp. 167-188 Cambridge University Press (1987).

* cited by examiner

*Primary Examiner* — Kamini S Shah
*Assistant Examiner* — Jay B Hann
(74) *Attorney, Agent, or Firm* — Daniel P. Morris; Michael J. Chang, LLC

(57) ABSTRACT

Techniques for analyzing flow of a quantity in a given domain are provided. In one aspect, a method for modeling regions in a domain affected by a flow of a quantity is provided which includes the following steps. A physical representation of the domain is provided. A grid that contains a plurality of grid-points in the domain is created. Sources are identified in the domain. Given a vector field that defines a direction of flow of the quantity within the domain, a boundary value problem is defined for each of one or more of the sources identified in the domain. Each of the boundary value problems is solved numerically to obtain a solution for the boundary value problems at each of the grid-points. The boundary value problem solutions are post-processed to model the regions affected by the flow of the quantity on the physical representation of the domain.

17 Claims, 10 Drawing Sheets

100

400

REGION OF OVERLAP BETWEEN
ACU #5 AND ACU #9

A MESH CONSISTING OF A SET OF NINE NODES AND EIGHT ELEMENTS

● : INDICATES A NODE

| ELEMENTS | CORRESPONDING NODES |
|---|---|
| E1 | 1, 2, 4 |
| E2 | 4, 2, 5 |
| E3 | 2, 3, 5 |
| E4 | 3, 6, 5 |
| E5 | 4, 5, 7 |
| E6 | 5, 8, 7 |
| E7 | 5, 6, 8 |
| E8 | 6, 9, 8 |

TECHNIQUES FOR DETERMINING PHYSICAL ZONES OF INFLUENCE

STATEMENT OF GOVERNMENT RIGHTS

This invention was made with Government support under Contract number DE-EE0002897 awarded by Department of Energy. The Government has certain rights in this invention.

FIELD OF THE INVENTION

The present invention relates to analysis of the flow of a quantity (e.g., a fluid (gas or liquid), electric current, etc.), and more particularly, to techniques for determining regions affected by transport of the quantity in a domain (such regions are also referred to herein as "zones of influence").

BACKGROUND OF THE INVENTION

The optimization of cooling resources within data centers, which includes the localized provisioning of cooling power with respect to heat dissipation, can lead to a significant reduction of energy consumption. See, for example, W. Tschudi et al., "Measuring and Managing Data-Center Energy Use," HPAC Engineering, pp. 45-51 (March 2006) and H. F. Hamann et al., "Uncovering energy-efficiency opportunities in data centers," IBM J. Res. & Dev., Vol. 53, No. 3, 10:1-10:12 (2009).

Such matching of cooling power with heat dissipation is rather straightforward for an entire data center. On a more granular level, however, the large range of heat densities of today's information technology (IT) equipment has made this task much more challenging. One complication comes from the fact that there is little operational information such as which physical areas, or zones, are supplied by the different air conditioning units (ACUs) so that local cooling demands can be met. See for example, E. Ferrer, et al., "Thermal Zone Mapping: Data Center Visualization Tool for Thermal Metric Analysis," IMAPS ATW (2007). Evidently, such zones are not only determined by the placement and air flow produced by each ACU but also by the locations of perforated tiles throughout the data center and many other parameters. Methodologies have been proposed for determining such thermal (or cooling) zones, where each zone is associated with the actual efficiency of the corresponding ACU by considering the respective utilization of the units (heat removed/nominal heat load removal capacity) or coefficient of performance (COP) (COP=heat removed/power consumption for ACU fans), and software tools have been developed to help operators use this information for improving data center energy efficiency. See, for example, U.S. patent application Ser. No. 12/540,034, filed by Hamann et al., entitled "Methods and Techniques for Creating and Visualizing Thermal Zones," filed Aug. 12, 2009 (hereinafter "U.S. patent application Ser. No. 12/540,034") and H. F. Hamann et al., "Thermal zones for more efficient data center energy management," *Proceedings of ITHERM2010* (2010) (hereinafter "Hamann 2010"), the contents of each of which are incorporated by reference herein. One approach used for determining thermal zones is to compute an air velocity field and then use streamline or particle tracing methods to explicitly trace air flow paths and associate these paths with the originating/returning ACUs. See, for example, U.S. patent application Ser. No. 12/540,034 and Hamann 2010. Using streamline or particle tracing methods for determining thermal zones, while effective, cannot always be performed quickly enough to give the immediate decision support sometimes needed when setting-up, rearranging and provisioning cooling in data centers.

Thus, faster, more efficient techniques for determining thermal zones would be desirable.

SUMMARY OF THE INVENTION

The present invention provides techniques for analyzing flow of a quantity (e.g., a fluid (gas or liquid), electric current, etc.) in a given domain. In one aspect of the invention, a method for modeling regions in a domain affected by a flow of a quantity is provided. The method includes the following steps. A physical representation of the domain is provided. A grid that contains a plurality of grid-points in the domain is created. Sources are identified in the domain. Given a vector field that defines a direction of flow of the quantity within the domain, a boundary value problem is defined for each of one or more of the sources identified in the domain. Each of the boundary value problems is solved numerically to obtain a solution for the boundary value problems at each of the grid-points. The boundary value problem solutions are post-processed to model the regions affected by the flow of the quantity on the physical representation of the domain.

A more complete understanding of the present invention, as well as further features and advantages of the present invention, will be obtained by reference to the following detailed description and drawings.

DETAILED DESCRIPTION OF PREFERRED EMBODIMENTS

Figure 1:
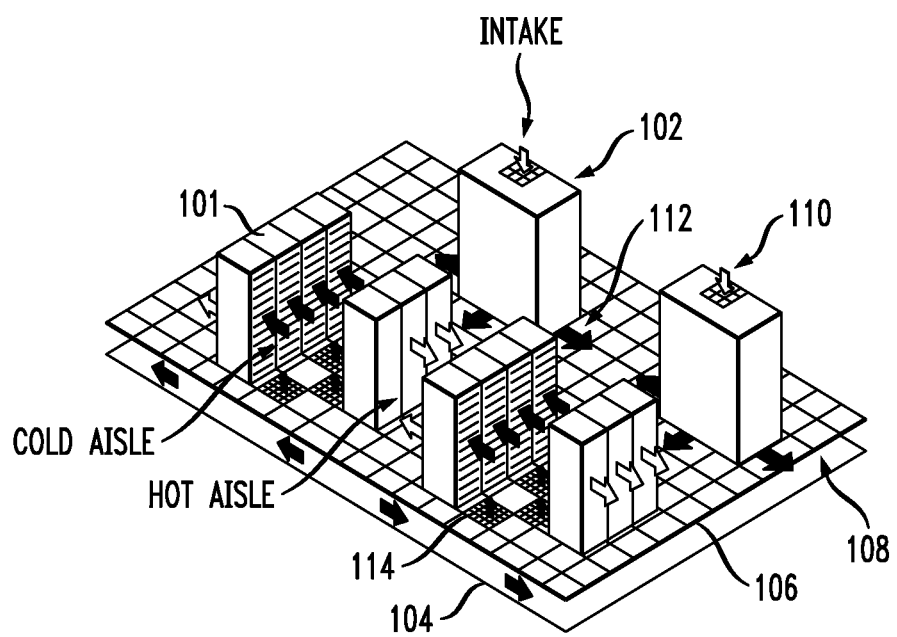
FIG. 1 is a diagram illustrating an exemplary data center according to an embodiment of the present invention.

Provided herein are techniques for determining regions in a given domain which are affected (i.e., influenced) by the transport (e.g., flow) of a quantity (where the term "quantity" as used herein refers generally to a fluid (gas or liquid), electric current, etc.), where the flow or direction of movement is defined by a given velocity field, electric field, etc. Examples include, but are not limited to, air in a room, a chemical solution and distribution of an electric field around a set of charged capacitors. These affected regions are also referred to herein as zones of influence. The transport mechanism (i.e., velocity field, electric field, etc.), described mathematically as a vector field, defines approximate regions for the zones of influence. These zones are defined from points of origin, or sources in the domain, to points of exit, or sinks in the domain. Air flow within a room, such as a data center, is an exemplary scenario to which the techniques provided herein may be applied. Similarly, the transport of a pollutant (e.g., chemical solution) in water or the distribution of electric/magnetic charges may be analyzed using the present techniques.

For example, if the velocity field of a ground water system has been calculated or is otherwise known, one could apply the present techniques to understand which "sources" and/or "sinks" influence which regions. A source might be a sewage pipe while a sink could be a well or leak. Such insights could fundamentally help to manage pollution in water systems. For example, if a river system is fed by several streams, the present techniques could be used to determine where these streams influence the river system. If one stream is polluted, the present techniques can be used to estimate the geographical zone which is impacted by this pollutant. A similar example includes the application of this technology to understand the regional impact of different "sources" and "sinks" on the traffic flow within a larger traffic system. An example could be a highway with exits (sinks) and entrances (sources). The present techniques could be used to make a prediction as to which area is being influenced by a particular entrance.

The present techniques may also be applied to problems in electromagnetics. Electric and/or magnetic charges, which might vary in space and time, result in electric and magnetic potentials. Such potentials govern the electric and magnetic field. By applying the present techniques to the electromagnetic fields, the regional influence of these electric and/or magnetic charges could be better understood, which might be important, e.g., for antenna placement and communication technologies. As an example, antennas (such as the ones which are mounted on a cell phone tower) might be the sources for an electromagnetic field. The sinks would be a large distance away from these antennas. The actual zone of influence of an individual antenna can be calculated using the techniques provided herein.

As highlighted above, the present techniques may be applied to air flow within a room such as a data center. An exemplary data center 100 is shown illustrated in FIG. 1. Data center 100 has server racks 101 and a raised-floor cooling system with air conditioning units (ACUs) 102 (which may also be referred to as computer room air conditioners (CRACs)) that take hot air in (typically from above through one or more air returns in the ACUs) and exhaust cooled air into a sub-floor plenum below. Hot air flow through data center 100 is indicated by light arrows 110 and cooled air flow through data center 100 is indicated by dark arrows 112. In the following description, the data center above the sub-floor plenum may also be referred to simply as the raised floor, and the sub-floor plenum may be referred to simply as the plenum. Thus, by way of example only, as shown in FIG. 1, the ACUs intake warm air from the raised floor and expel cooled air into the plenum (see below).

In FIG. 1, server racks 101 use front-to-back cooling and are located on raised-floor 106 with sub-floor 104 beneath. Namely, according to this scheme, cooled air is drawn in through a front (inlet) of each rack and warm air is exhausted out from a rear (outlet) of each rack. The cooled air drawn into the front of the rack is supplied to air inlets of each information technology (IT) equipment component (servers for example) therein. Space between raised floor 106 and sub-floor 104 defines the sub-floor plenum 108. The sub-floor plenum 108 serves as a conduit to transport, e.g., cooled air from the ACUs 102 to the racks. As shown in FIG. 1, raised-floor 106 consists of a plurality of floor tiles, some of which are perforated. In a properly-organized data center (such as data center 100), racks 101 are arranged in a hot aisle—cold aisle configuration, i.e., having air inlets and exhaust outlets in alternating directions. Namely, cooled air is blown through the perforated floor tiles 114 (also referred to as vents) in raised-floor 106, from the sub-floor plenum 108 into the cold aisles. The cooled air is then drawn into racks 101, via the air inlets, on an air inlet side of the racks and dumped, via the exhaust outlets, on an exhaust outlet side of the racks and into the hot aisles.

The ACUs typically receive chilled water from a refrigeration chiller plant (not shown). Each ACU typically comprises a blower motor to circulate air through the ACU and to blow cooled air, e.g., into the sub-floor plenum. As such, in most data centers, the ACUs are simple heat exchangers mainly consuming power needed to blow the cooled air into the sub-floor plenum. Typically, one or more power distribution units (PDUs) (not shown) are present that distribute power to the server racks 101.

Figure 2:
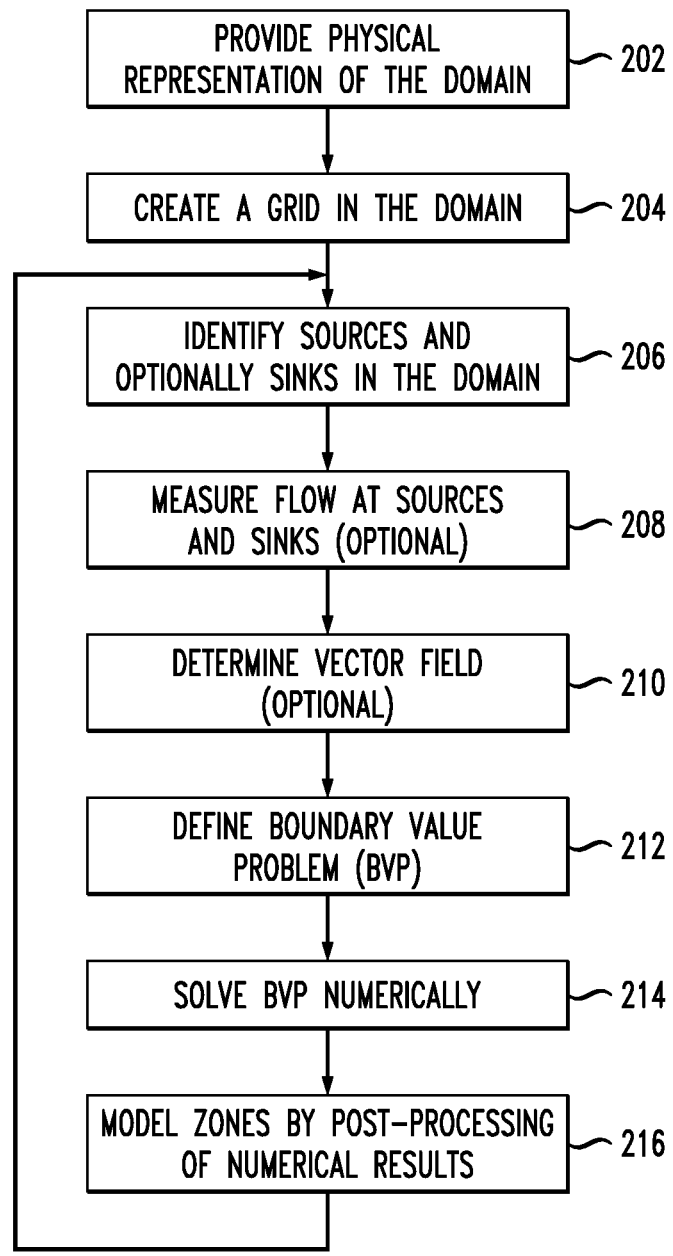
FIG. 2 is a diagram illustrating an exemplary methodology for modeling zones of influence in a domain according to an embodiment of the present invention.

FIG. 2 is a diagram illustrating exemplary methodology 200 for modeling regions in a domain affected by a flow of a quantity (i.e., zones of influence). As provided above, the domain may be part of a ground water system, a domain with an electromagnetic field such as an area with an antenna or some other physical space, such as the sub-floor plenum of a data center (for example data center 100 of FIG. 1). Using the data center embodiment as an example, methodology 200 may be used to identify boundaries for zones of influence, and therefore such zones themselves, within the data center, or a portion thereof. For example, the following description will refer to an example of using the present techniques to model the sub-floor plenum portion of a data center. In the context of a data center, the zones of influence are also referred to herein as "thermal zones" since the sources of air (the quantity), in this example the ACUs (see below), provide cooling air flow in the sub-floor plenum. Being able to elucidate the various thermal zones within a room such as a data center allows for operators to configure (or reconfigure as needed) the layout of the data center to best optimize the cooling capabilities of the ACUs.

The term "domain" as used herein refers generally to the area in which flow will be analyzed by the present techniques. Thus, in the data center sub-floor plenum example, the domain is defined by the dimensions of the sub-floor plenum. A given system or space may have multiple domains. Again using the example of a data center, while the sub-floor plenum may constitute one domain, the raised floor (i.e., the data center above the sub-floor plenum) may constitute another domain in the data center.

In step 202, a physical representation of the domain is provided. For illustrative purposes, a two-dimensional physical representation of the sub-floor plenum of a data center is provided in FIG. 3, described below. By way of example only, in the context of a data center sub-floor plenum, the physical representation can include, e.g., the layout of the vents or perforated tiles and the ACUs. In a ground water system, the physical representation can include, e.g., the layout of the sewage pipe and the well or leak. The physical representation can be created using a software application which "draws" the assets such as the ACUs. Suitable software applications include, but are not limited to, a mobile management technology software application.

Figure 10:
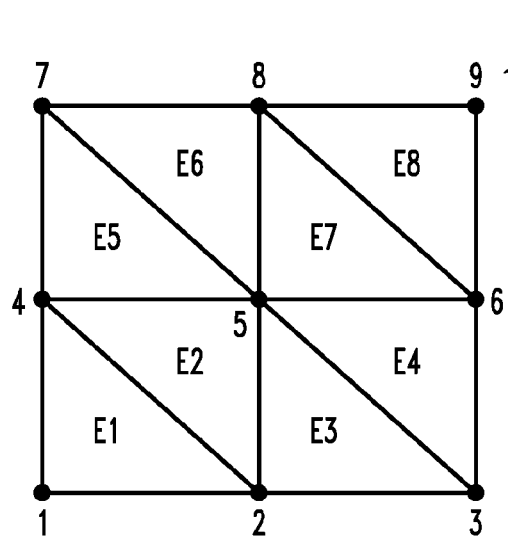
FIG. 10 is a diagram illustrating an exemplary finite element mesh according to an embodiment of the present invention.

In step 204, a grid containing a plurality of grid-points is created in the domain. These grid-points are the spatial coordinates in the domain at which the numerical solution of the boundary value problem used to model the zones of influence is to be computed. Creating a grid requires picking points in the domain, i.e., space coordinates (x,y) in a two-dimensional space or (x,y,z) in a three-dimensional space, where one wants to compute approximate values of the solution of the boundary value problem (to be defined below). By way of example only, in one embodiment finite elements are employed to model the domain, and the grid is a finite elements mesh which is created in the domain by sub-dividing the domain into a set of discrete sub-domains that interconnect a plurality of nodes. As will be described in detail below, the sub-domains (also referred to herein as "elements") can be triangles (in the case of two-dimensional domains) or tetrahedra (in the case of three-dimensional domains). The use of triangles and tetrahedra are standard choices in the finite element method. The mesh nodes correspond to x and y coordinates (in the case of two-dimensional domains) or to x, y and z coordinates (in the case of three-dimensional domains), i.e., to the grid-points. An exemplary finite elements mesh is shown in FIG. 10, described below.

In step 206, flow sources (and optionally flow sinks) are identified in the domain. The identification of the sources is needed because the sources are used to set up the boundary value problem (BVP) which is used to determine the zones of influence (see below). A vector field defining the direction of the flow (e.g., the air velocity field in the data center example (see below)) captures the "contribution" of the sinks. Since this vector field is also needed to set up and solve the BVP, the role of the sinks in defining the zones is implicit through the use of the vector field defining the direction of the flow. Thus, if the vector field is given (has already been determined for the domain) then identification of the sinks in this step is not necessary, and thus optional. On the other hand, if the vector field needs to be determined, the identification of both the sources and sinks in the domain is needed, since measurements at both the sources and sinks will be needed to determine the vector field. In a sub-floor plenum for example, the air flow sources (where the air enters the domain) and air flow sinks (where the air exits the domain) are identified in this step. By way of example only, with the sub-floor plenum domain the perforated tiles can be considered air flow sinks (because it is at the perforated tiles where the cooled air supplied by the ACUs exits the sub-floor plenum and enters the raised floor) and the ACUs can be considered air flow sources (because the airflow originates/enters the sub-floor plenum from the ACUs). By contrast, when the domain includes the raised floor the perforated tiles can be considered air flow sources (because it is at the perforated tiles where the cooled air from the plenum enters the raised floor) and the ACUs can be considered air flow sinks (because the warm air is cycled back into the ACUs and thus exits the raised-floor at the ACUs).

The same logic can be applied to other systems dealing with transport phenomena. For example, as highlighted above, in a ground water system a sewage pipe can be considered a water flow source (a point at which water entering the ground water system can originate) and a well or a leak can be considered water flow sinks (points at which water exits the ground water system). One of ordinary skill in the art can, given the present teachings, identify sources and sinks in a given flow transport system.

As highlighted above, a vector field defining the direction of the flow of the quantity (water, air, etc.) within the domain is needed to set up and solve the BVP. For a given domain, the vector field may already be known (i.e., was previously computed) and that known vector field may simply be provided for use in the present process. However, if the vector field is not known for a given domain, in order to provide a vector field for use in the present process, the vector field first needs to be determined. To determine the vector field, in step 208, flow measurements are obtained from one or more of the sources and sinks for use in computing the vector field (see below). It is notable that when the vector field is known (given), these flow measurements are not needed, thus making step 208 optional.

In the context of the sub-floor plenum domain, air flow measurements are obtained in this step from one or more of the air flow sources and sinks. According to an exemplary embodiment, these air flow measurements are made using mobile measurement technology (MMT). MMT is described for example in U.S. Pat. No. 7,366,632, issued to Hamann et al., entitled "Method and Apparatus for Three-Dimensional Measurements" (hereinafter "U.S. Pat. No. 7,366,632"), the contents of which are incorporated by reference herein. MMT V1.0 is a technology for optimizing data center infrastructures for improved energy and space efficiency which involves a combination of advanced metrology techniques for rapid measuring/surveying data centers (see, for example, U.S. Pat. No. 7,366,632) and metrics-based assessments and data-based best practices implementation for optimizing a data center within a given thermal envelope for optimum space and most-efficient energy utilization (see, for example, U.S. patent application Ser. No. 11/750,325, filed by Claassen et al., entitled "Techniques for Analyzing Data Center Energy Utilization Practices," the contents of which are incorporated by reference herein).

With other systems, flow measurements at the sources and sinks can be similarly quantified. In a ground water system, for example, water flow can be measured using, for example, a mechanical or ultrasonic flow meter. One of ordinary skill in the art would, given the present teachings, be able implement techniques to quantify flow at the sources and sinks of a given flow transport system.

In step 210, the flow measurements obtained from the sources and sinks are used to determine a vector field that defines the direction of transport within the domain. As highlighted above, the vector field may be already known (given). In that instance steps 208-210 are not performed.

In the sub-floor plenum example, the air flow measurements obtained from the air sources and sinks are used to determine an air velocity vector at a center of each element. By way of example only, these velocity vectors can be determined using potential flow theory. Namely, potential flow theory may be employed assuming constant (temperature independent) air density, free slipping over boundaries and that viscous forces can be neglected. For a general description of potential flow theory see, for example, L. D. Landau et al., "Fluid Mechanics," pp. 14-21 Pergamon Press (1987), the contents of which are incorporated by reference herein.

The velocity vectors collectively represent a velocity field v that defines the distribution of flow in the domain Ω (see, for example, FIG. 3, described below, which illustrates the air flow distribution defined by the air velocity field v in the sub-floor plenum example). For example, as the air velocity $v=(v_x, v_y, v_z)$ is assumed to be irrotational, that is, curl v=0, the velocity can be taken to be the gradient of a scalar function φ. This function φ is called the "velocity (or air flow) potential" and it satisfies the Poisson equation. In other words, the (air) velocity field corresponds to a solution of:

$$\left(\frac{\partial^2 \phi}{\partial x^2}\right) + \left(\frac{\partial^2 \phi}{\partial y^2}\right) + \left(\frac{\partial^2 \phi}{\partial z^2}\right) = f$$

$$v_x = \frac{\partial \phi}{\partial x} \quad v_y = \frac{\partial \phi}{\partial y} \quad v_z = \frac{\partial \phi}{\partial z}$$

with appropriate boundary conditions. Here, f represents flow sources or sinks and $v_x$, $v_y$ and $v_z$ are the velocity components in the x, y and z directions, respectively. It is notable that other more comprehensive partial differential equations (PDEs) can be used in accordance with the present techniques, which may include turbulence models and dissipation.

In order to provide boundary conditions for the above problem one could, for example, model vents or perforated tiles (or the output of ACUs) as "sources"

$$\left(\frac{\partial \phi}{\partial z} = -\text{(measured) output velocity from a perforated tile}\right),$$

the returns to the ACUs as "sinks" (φ=0), while the racks are sinks $$\left(\frac{\partial \phi}{\partial x} = \text{(measured) inlet rack flow}\right)$$

and source $$\left(\frac{\partial \phi}{\partial x} = -\text{(measured) outlet rack flow}\right)$$

at the same time. As described above, the sources and sinks can vary depending on the domain (e.g., when the domain includes the sub-floor plenum the perforated tiles and ACUs can be considered sinks and sources, respectively; on the other hand when the domain includes the raised floor the perforated tiles and ACUs can be considered sources and sinks, respectively). Another alternative is to model the sources and sinks via a non-zero right-hand side f in the equation $$\left(\frac{\partial^2 \phi}{\partial x^2}\right) + \left(\frac{\partial^2 \phi}{\partial y^2}\right) + \left(\frac{\partial^2 \phi}{\partial z^2}\right) = f.$$

If the sources or sinks are located on boundaries of the solution domain of the PDE, the former approach is appropriate (as it corresponds to the specification of Neumann boundary conditions). For sources or sinks that are located inside the solution domain (that is, not on boundaries), modeling via a non-zero right-hand side f in the equation $$\left(\frac{\partial^2 \phi}{\partial x^2}\right) + \left(\frac{\partial^2 \phi}{\partial y^2}\right) + \left(\frac{\partial^2 \phi}{\partial z^2}\right) = f$$

would be more suitable.

One approach to determine the zones is to (explicitly) trace the streamlines defined by the velocity field v once v has been computed. See, for example, U.S. patent application Ser. No. 12/540,034 and Hamann 2010. The zones (in this case thermal zones) resulting from the method of (explicit) tracing of streamlines for the velocity field from FIG. 3 are depicted in FIG. 6A of Hamann 2010. The techniques disclosed herein do not employ streamline (or particle) tracing, but instead require the solution of a BVP. Namely, in step 212, the vector field v and knowledge of the location of sources within the domain are used to define a BVP for a convection-diffusion equation for each of the sources identified in the domain. An exemplary BVP is described in detail below.

As highlighted above, the sources (identified in step 206) are used to set up the BVP. The location of a source in the domain is the location in (physical) space that the object acting as a source (e.g., an ACU in the data center example) occupies. This location is defined by a set of spatial coordinates in the domain, i.e., by a set of grid-points. Recall that a grid-point corresponds to a point in the domain identified by (x,y) coordinates in a two-dimensional domain or (x,y,z) coordinates in a three-dimensional domain. The location of the sources in the domain is needed to set up the BVP.

In step 214, a numerical method that can solve convection-dominated problems accurately is used to solve each of the BVPs numerically to obtain a solution for the BVPs at each of the grid-points. An exemplary methodology for setting up and solving a BVP for modeling zones of influence is described in conjunction with the description of FIG. 4, below. That description is incorporated by reference herein. In step 216, post-processing of the solution of the BVPs is used to model the zones of influence on the physical representation of the domain. For example, in order to visualize the zones of influence the solution to the BVPs can be plotted on the physical representation of the domain. See, for example, FIG. 6 (multiple zones determined at once) or FIGS. 8 and 9 (zones determined individually and superimposed on the physical representation), described below.

As shown in FIG. 2, steps 206-216 of methodology 200 can be repeated in response to changes in the flow (air flow, water flow etc.) at one or more of the sources/sinks, one or more new sources/sinks being added to the domain and/or one or more of the sources/sinks being removed from the domain. For example, by way of reference to a data center, the air flow at one or more of the vents or perforated tiles may be increased or decreased and/or one or more of the vents or perforated tiles may be relocated or removed. In this case, computation or re-computation of the vector field would be needed. Advantageously, as long as the domain/grid does not change, then these elements can be recycled in subsequent iterations of the methodology saving on processing time.

Each time the above-described steps are repeated, updated flow measurements from the sources and sinks can be acquired (if available) therefore making the instant techniques sensitive to changing conditions within the domain. By way of example only, steps 206-216 can be repeated periodically (for example at a pre-determined time interval) to acquire updated zones of influence data. The pre-determined time interval can be set, for example, based on a frequency at which updated measurement data is available and/or a frequency with which changes occur in the domain.

Figure 3:
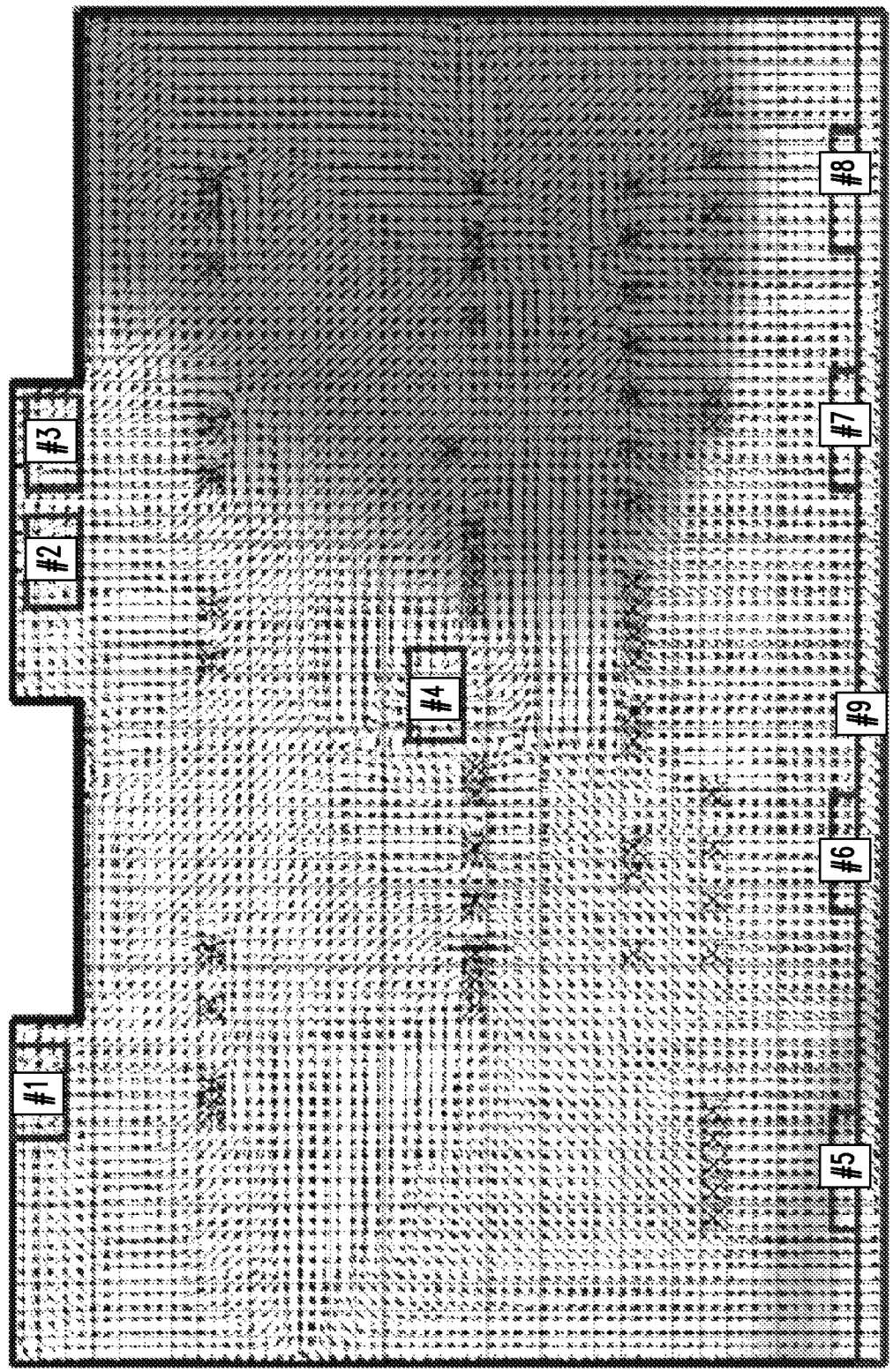
FIG. 3 is a diagram illustrating air distribution (i.e., an air velocity field) in an exemplary sub-floor plenum of a data center according to an embodiment of the present invention.

FIG. 3 is a diagram illustrating an example of air distribution (an air velocity field) in a sub-floor plenum of a data center. As shown in FIG. 3, the ACUs, labeled with numbers 1-9 are supplying air through vents or perforated tiles (depicted as hatched boxes), as can be observed by following the vector arrows collectively depicting the velocity field v.

Figure 4:
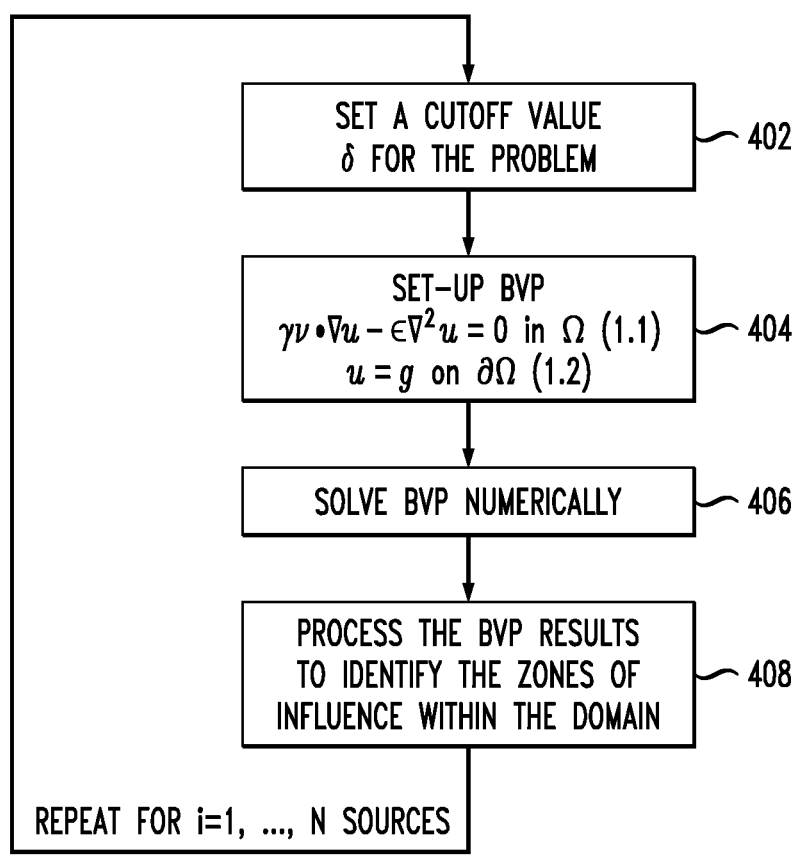
FIG. 4 is a diagram illustrating an exemplary methodology for setting up a boundary value problem (BVP) for analyzing flow data and using the BVP to model zones of influence in a domain according to an embodiment of the present invention.

FIG. 4 is a diagram illustrating exemplary methodology 400 for setting up a BVP for each of the sources in a domain and using the BVP to model the zones of influence. As will be described in detail below, the present process can be used to determine one zone of influence at a time, or alternatively multiple zones can be determined at once. The following example is directed to determining the zones of influence one at a time with the understanding that one of ordinary skill in the art, given the description provided herein, would know how to implement the present teachings in the context of determining multiple zones at once. In step 402, a cutoff value δ for the problem is set. Namely, as will be described in detail below, if the solution u of the BVP, evaluated at a given grid-point is greater than or equal to (≥) the cutoff value δ, then the corresponding grid-point is considered to be within the zone of influence of the source for which the BVP has been solved. Thus, the cutoff value roughly defines a boundary between the nodes (also referred to herein as "grid-points") falling within a zone of influence and those falling outside the zone of influence. The cutoff should be near (or at) the midpoint between the two values used to set u in the boundary condition (1.2) below of the BVP. By way of example only, if the values 0 and 1 are used to set u via equation (1.2) below, then an appropriate cutoff δ ∈ (0,1) is δ=0.5.

Step 402 applies in the situation where the zones of influence are determined one at a time. By contrast, if multiple zones are being determined at once, then there are multiple cutoff values to set. For example, if one is to determine 3 zones at once this could be modeled by using, e.g., the values 1, 2, 3 to set u in the boundary condition 1.2 below. After the BVP is solved, then the comparison with the cutoff value would be different for each zone. For example, by reference to the sub-floor plenum example shown in FIG. 3, described above, the zone corresponding to the transport process originating at source #1 could be defined by the condition u≤1.5 (so the cutoff here is 1.5), that for source #2 could use the condition 1.5<u≤2.5, and that for source #3 use the condition u>2.5.

Next, in step 404, given the vector field v (step 210 of FIG. 2) and the number N of sources (of air, water, etc.), for i=1, ..., N, the BVP is defined as follows:

$$\gamma v \cdot \nabla u - \epsilon \nabla^2 u = 0 \text{ in } \Omega \quad \quad 1.1$$

$$u = g \text{ on } \partial\Omega \quad \quad 1.2$$

wherein u is the unknown function, $\gamma$ is a positive constant, $\epsilon$ is a non-negative constant, $\Omega$ is the solution domain of the partial differential equation (PDE), $\partial\Omega$ is (a section of) the boundary of $\Omega$, and the function g is a function prescribing a value of u on the boundary $\partial\Omega$. The vector field v is considered to be static or fixed at a given point in time (so multiple instances in time define multiple vector fields for which regions affected by the flow of the quantity can be determined). For the purpose of modeling zones of influence in the present techniques, the sources are modeled as belonging to the boundary of the domain. As indicated further below, via the boundary condition 1.2, a constant value is assigned to u at grid-points with coordinates corresponding to the location of sources. The function u obtained via the solution of the BVP 1.1-1.2 thus represents a scalar "carrier," since it is modeled to carry (or transport) throughout the domain the values prescribed via the boundary condition 1.2. With this procedure, zones of influence are being defined within the domain, as will be described further below.

Figure 5A:
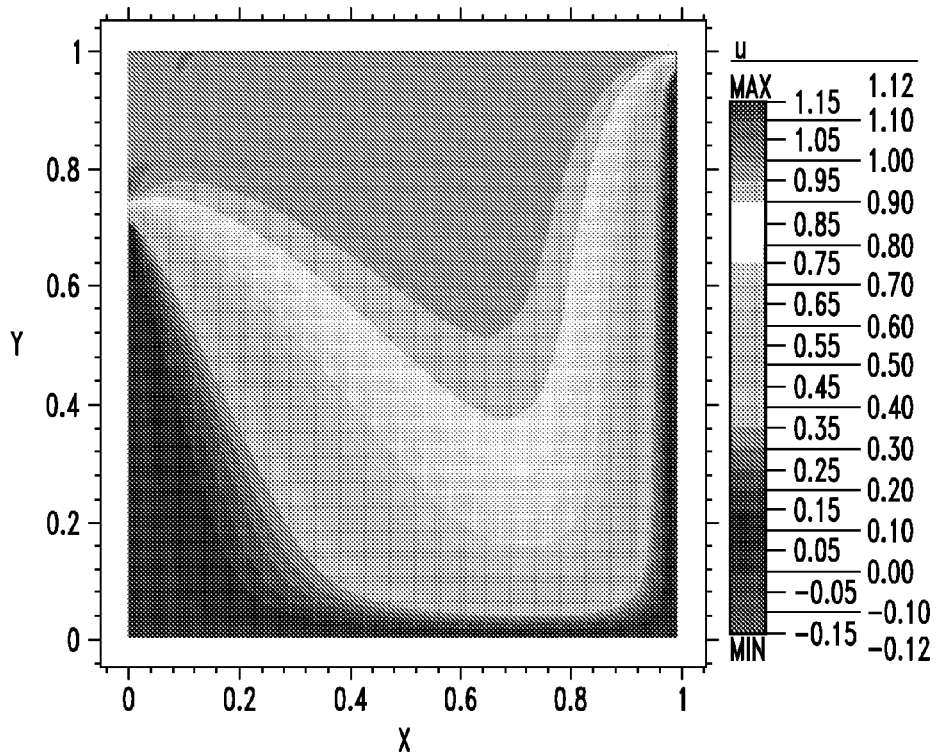
FIG. 5A is a diagram illustrating a solution for one formulation of the BVP to illustrate how solutions of the BVP can exhibit different behavior depending on how the inputs to the BVP are defined according to an embodiment of the present invention.
Figure 5B:
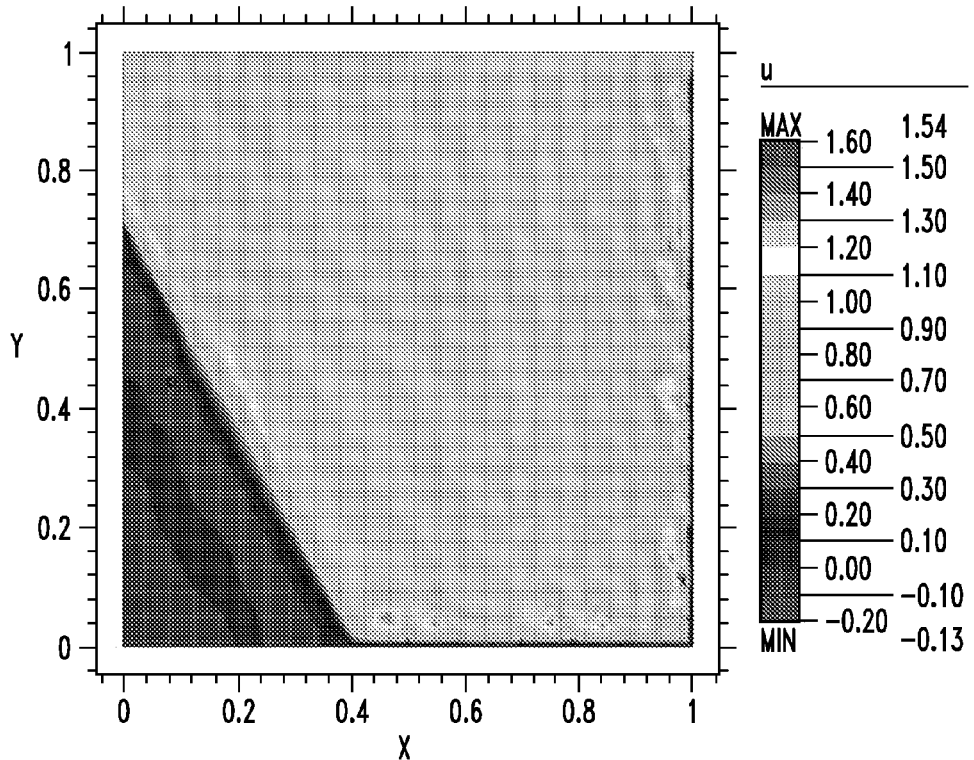
FIG. 5B is a diagram illustrating a solution for another formulation of the BVP using a different diffusivity constant from that shown in FIG. 5A to illustrate how the BVP can exhibit different behavior depending on how the inputs to the BVP (in this particular example the diffusivity constant) are defined according to an embodiment of the present invention.

The behavior of solutions of a PDE is determined by the values of the parameters that the PDE depends on, in addition to the boundary conditions imposed. In the case of the convection-diffusion Equation 1.1, the parameters are the convective velocity $\gamma v$ and the diffusivity constant $\epsilon$. For example, FIGS. 5A and B are diagrams illustrating two solutions of the BVP 1.1-1.2 corresponding to the same $\gamma v$ and g, but different values of the diffusivity constant $\epsilon$. Specifically, in FIG. 5A the diffusivity constant $\epsilon$=0.05. In FIG. 5B, the diffusivity constant $\epsilon$=1.0e−7. Note that the solution in FIG. 5B exhibits a sharp (i.e., well-defined) "front", at points on the line y=0.7−1.75x. To either side of this line, the solution u is (basically) constant. The solution in FIG. 5A does not exhibit the aforementioned characteristics. The solution in FIG. 5B corresponds to a case where the convection term $\gamma v \cdot \nabla u$ dominates the diffusion term $\epsilon \nabla^2 u$ (i.e., $\gamma \|v\| \gg \epsilon$). Two different (constant) values on the boundary are being transported via the process of convection and the interface at which these two different values "meet" generates a sharply defined front (corresponding to a discontinuity of the solution). It is this type of behavior which is replicated in the present techniques, so that the thermal zones boundaries correspond to sharply defined fronts of the solution of the BVP. Thus, for the purpose of modeling zones of influence, it is desirable to choose conductivity and diffusivity constants such that the convection term $\gamma v \cdot \nabla u$ dominates the diffusion term $\epsilon \nabla^2 u$ (i.e., $\gamma \|v\| \gg \epsilon$). It is notable that FIGS. 5A and B do not show zones of influence, but are provided herein merely to illustrate behavior (i.e., sharp fronts in the solution) we wish to replicate in the present process.

To summarize, the idea is to formulate the problem of determining zones of influence as a BVP for the convection-diffusion equation 1.1 such that the boundaries of the zones correspond to sections within the domain where the solution u of the BVP 1.1-1.2 desirably exhibits sharp fronts or discontinuities (such as that shown in FIG. 5B). Employing a numerical method for solving the resulting BVPs that is capable of accurately resolving such sharp fronts is an important component in the whole process, as then the zones of influence and their boundaries can be determined by simply inspecting the values of u and/or the gradient ∇u resulting from the numerical solution of the BVP 1.1-1.2.

The function g in the Dirichlet boundary condition 1.2 is then defined. To compute only one zone of influence (e.g., one thermal zone), say that for the i-th source (e.g., i-th ACU, wherein i=1, . . . N (see above)), g in Equation 1.2 is defined as:

$$g_k=1, \quad\quad 1.3$$

if k corresponds to the location of a grid-point falling on the boundary of the i-th source (e.g., i-th ACU), and $$g_k=0 \quad\quad 1.4$$

if k corresponds to the location of a grid-point falling on the boundary of the remaining sources (i.e., other than the i-th ACU), where $g_k$ denotes g evaluated at the k-th node. At points falling on other domain boundaries (non-source, e.g., non-ACU, boundary points), $$n \cdot \nabla u = 0 \quad\quad 1.5$$

is imposed, wherein n denotes the outward unit normal at a point on the boundary. Alternatively, more than one zone could be determined at once by setting the value of u at grid-points falling on boundaries of the respective sources (e.g., ACUs) to distinct values, but constant for each source, through the boundary condition (1.2).

Next, in step 406, the BVP is solved numerically to obtain a solution for the boundary value problems at each of the grid-points using a method capable of solving convection-dominated problems accurately that is, employing a method capable of resolving sharp fronts or discontinuities in the solution accurately. Identification of the zones of influence and their boundaries can then be achieved after solving the BVP numerically by simply processing the numerical values resulting from the solution of the BVP. There are various numerical methods that are suitable for solving Equation 1.1 in the convection-dominated case. See, for example, A. N. Brooks et al., "Streamline upwind/Petrov-Galerkin formulations for convection dominated flows with particular emphasis on the incompressible Navier-Stokes equations," *Computer Methods in Applied Mechanics and Engineering*, vol. 32, pp. 199-259 (1982) and C. Johnson, *Numerical Solution of Partial Differential Equations by the Finite Element Method*, pp. 167-188 Cambridge University Press (1987), the content of each of which are incorporated by reference herein.

In step 408, the results from the numerical solution of the BVP are processed. For j=1, . . . , number of grid-points, if $u_j \geq \delta$, the j-th grid-point is identified as belonging to the zone of influence of the i-th source (wherein i=1, . . . N (see above)). In this manner, the zones of influence of each of the sources in the domain can be identified. As shown in FIG. 4, when the zones of influence are determined one at a time, the steps of methodology 400 are repeated for each source.

The N BVPs do not need to be solved sequentially, i.e., for each of the sources in sequence. The N BVPs can be solved in parallel as the BVPs are independent of one another. What needs to be done afterwards is to integrate the results from the individual problems, i.e., integrate the resulting zones for visualization or further processing, as needed.

It is notable that, even without the ability to solve the N BVPs in parallel, solving the BVPs for each zone of influence in sequence (as opposed to setting up the BVP to model multiple zones at once, which would require the BVP to be solved less number of times) does not result in a significant increase in computational time. This is due to the fact that the discretization of the BVP 1.1-1.2 (coupled with Equation 1.5) results in a system of linear algebraic equations $$A\tilde{u}=b \quad\quad 1.6$$

where changes in the boundary condition 1.2 result in changes in the right-hand side b of 1.6, but not the coefficient matrix A. Hence, solving the N BVPs in sequence translates into solving a linear system with multiple right-hand sides, which can be done efficiently if one reuses the numerical factorization of the matrix A when a direct solver for linear systems is used (or, in the case of an iterative solver for linear systems, reuse of the preconditioner).

Solving for the thermal zones individually (as opposed to setting up the BVP to model multiple zones at once) may be advantageous when there are areas of overlap between different zones. These areas of overlap may result from the velocity field or may be due to the approximations used in the numerical solution process. Note that, since Equation 1.1 is linear in the unknown u, multiple zones (for the same velocity field v) can be identified by superposition of the solutions corresponding to individual zones. Now, as an example, consider a case where the zones of influence for four sources (e.g., four ACUs) are determined at once, by setting $g_k$=i in Equation 1.2 if k corresponds to the location of a grid-point falling on the boundary of the i-th source, for i=1, . . . , 4. Upon solving the discretized system in Equation 1.6, grid-points where the value of ũ is (numerically) equal to, e.g., 3, could correspond to a grid-point falling on the thermal zone of the $3^{rd}$ source (e.g., $3^{rd}$ ACU), but it could also correspond to a point of overlap between other zones. Identifying the zones individually using the boundary conditions 1.3-1.4 and subsequently doing a superposition of the solutions, however, would make the distinction easier to identify.

Figure 6:
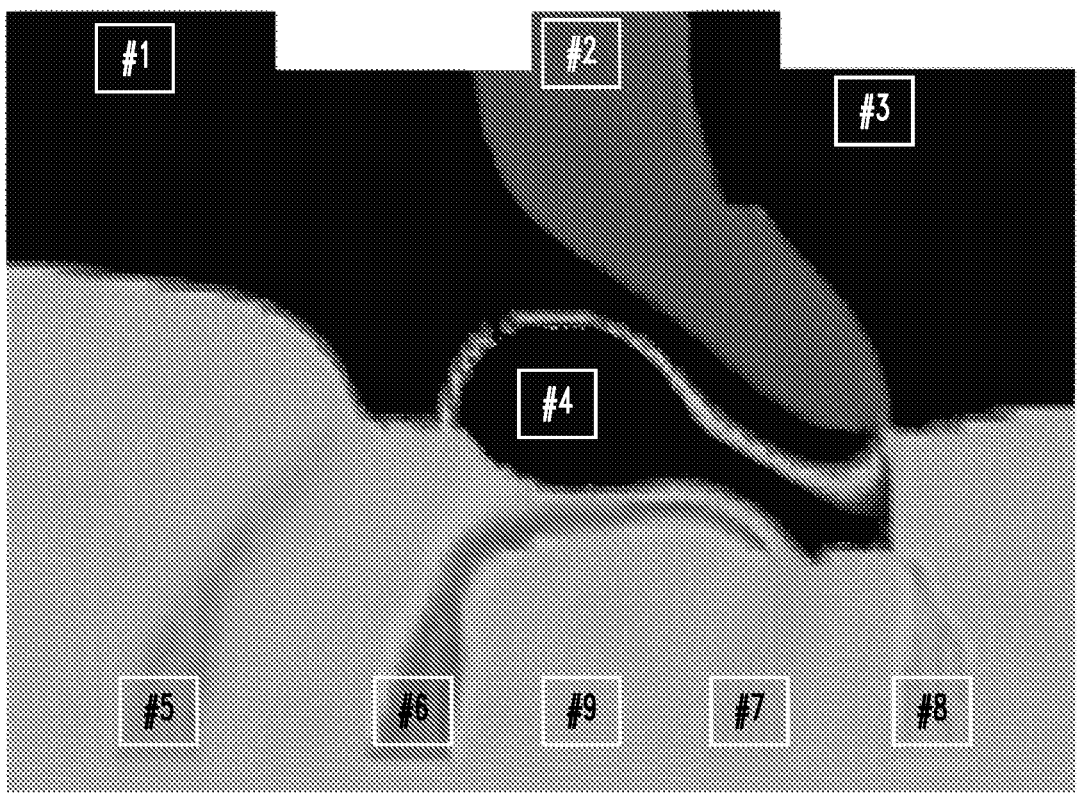
FIG. 6 is a diagram illustrating zones of influence determined using the present boundary value problem techniques when set up to model all zones at once according to an embodiment of the present invention.
Figure 7B:
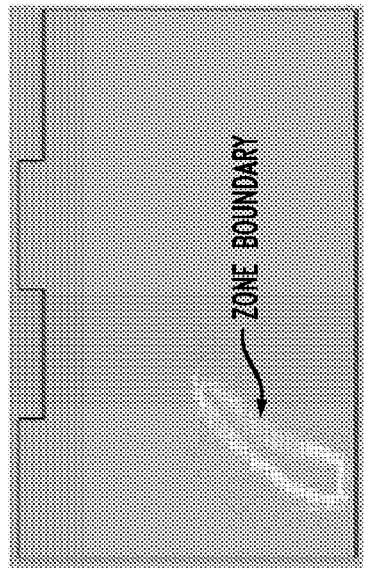
FIG. 7B is a vector plot of the gradient $\nabla u$ of the solution of the BVP set up to model one zone of influence in a domain according to an embodiment of the present invention.
Figure 7D:
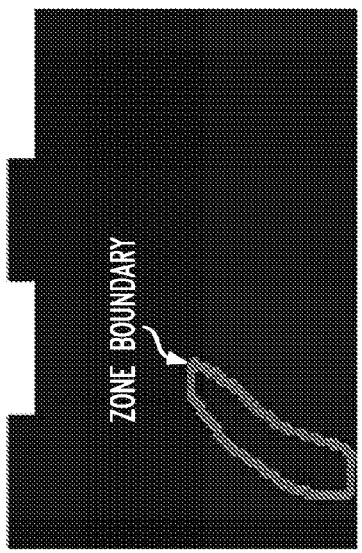
FIG. 7D is a diagram illustrating post-processing of the gradient ∇u of the solution of the BVP set up to model one zone of influence in a domain, highlighting the boundary of the resulting zone, according to an embodiment of the present invention.
Figure 7A:
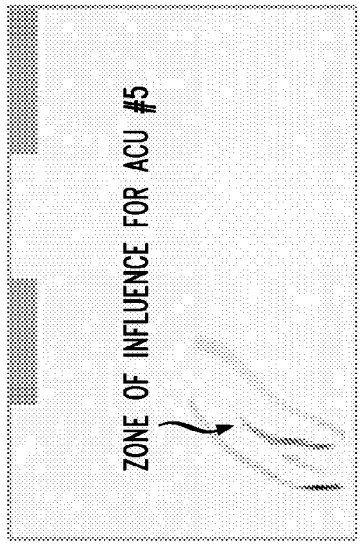
FIG. 7A is a surface plot of the solution u of the BVP set up to model one zone of influence in a domain according to an embodiment of the present invention.
Figure 7C:
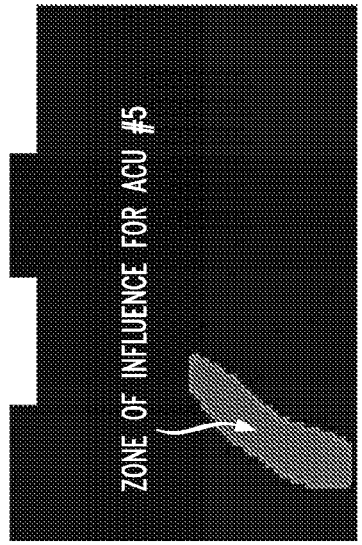
FIG. 7C is a diagram illustrating post-processing of the solution u of the BVP set up to model one zone of influence in a domain, highlighting the resulting zone, according to an embodiment of the present invention.

Using the exemplary sub-floor plenum example from FIG. 3, FIG. 6 illustrates the zones of influence (in this case thermal zones) resulting from the use of the present techniques for computing all 9 zones at once. The labels in FIG. 6 correspond to those in FIG. 3. FIG. 6 shows how the zones can be visualized by directly plotting the resulting solution u of the BVP 1.1-1.2, coupled with Equation 1.5. FIG. 6 is a surface plot of the solution u. Surface plots (as well as vector plots) can be generated using any standard visualization software. Examples include, but are not limited to, OpenDX, Mayavi2, Matlab® and gnuplot.

The results in FIG. 6 can be compared with those shown in FIG. 6A of Hamann 2010. FIG. 6A in Hamann 2010 illustrates the results from the method of (explicit) tracing the streamlines for the air velocity field. Thus, the comparison shows that very good agreement can be observed between these two approaches for computing the thermal zones.

Figure 8:
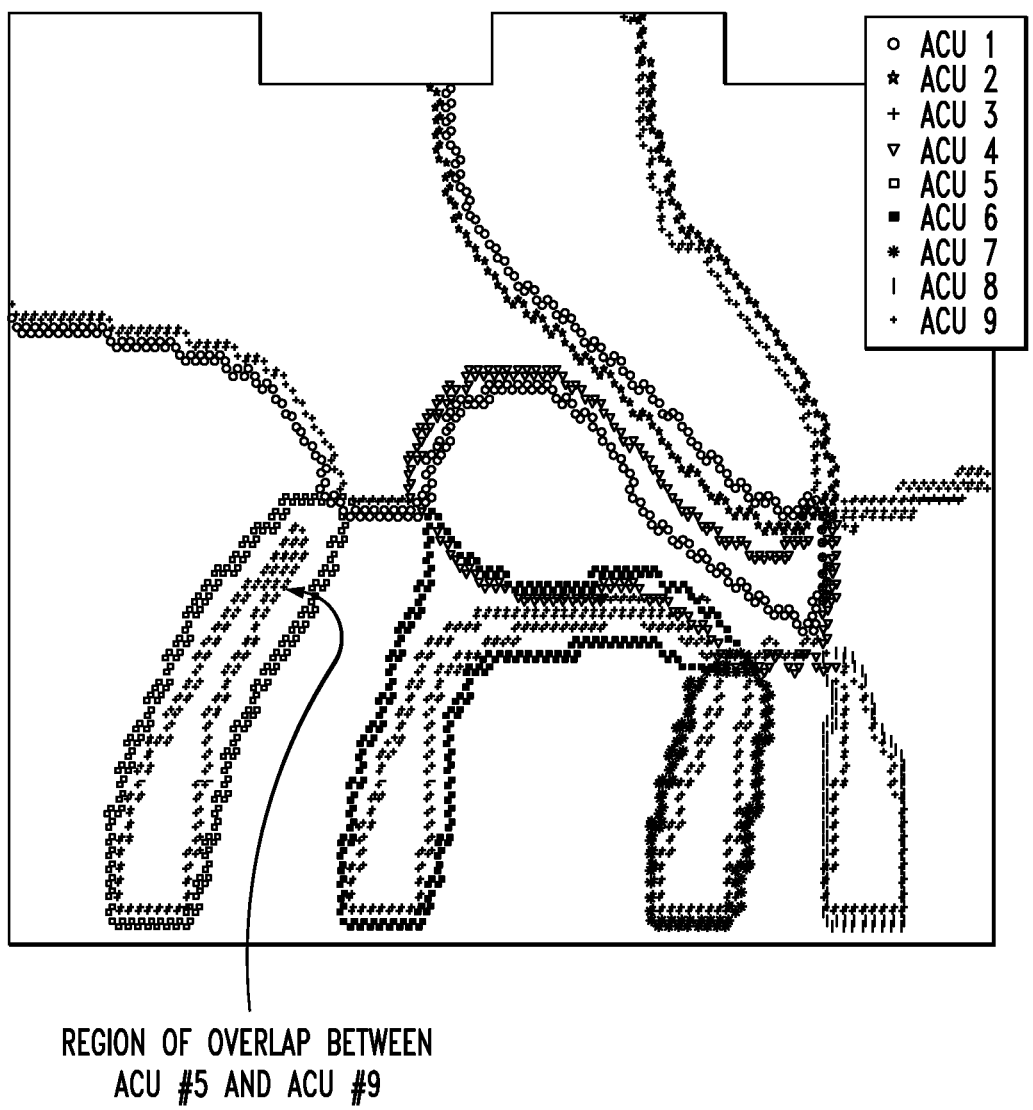
FIG. 8 is a diagram illustrating approximate thermal zone boundaries resulting from the application of the present techniques to the sub-floor plenum example of FIG. 3 when the BVP is set up to model each one of the zones individually according to an embodiment of the present invention.
Figure 9:
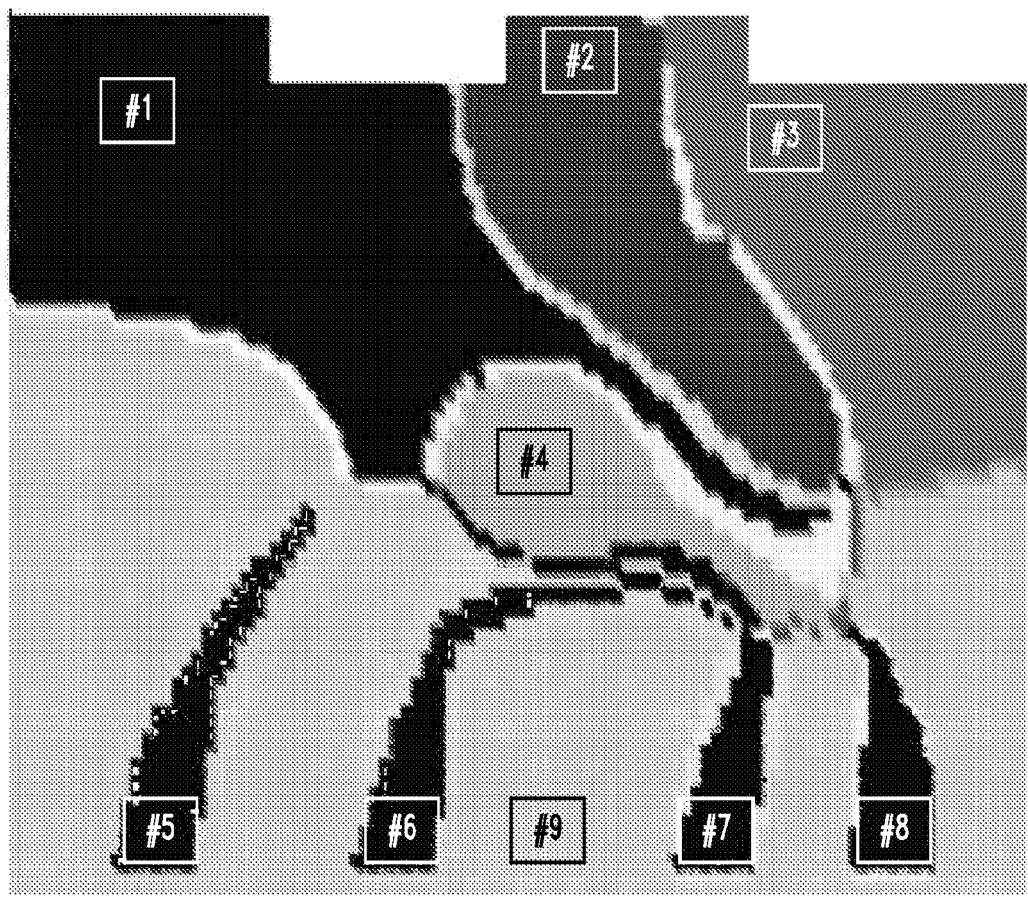
FIG. 9 is a diagram illustrating superposition of the individually computed thermal zones according to an embodiment of the present invention.

FIGS. 7-9 illustrate computation of individual zones and their subsequent superposition. Namely, FIG. 7A is a surface plot of the numerical solution u for the BVP 1.1-1.5 formulated for computing in this case the thermal zone for ACU #5 from the exemplary sub-floor plenum of FIG. 3. FIG. 7B is a vector plot of the gradient ∇u for the BVP 1.1-1.5 formulated for computing in this case the thermal zone for ACU #5 from the exemplary sub-floor plenum of FIG. 3. FIG. 7B is included to illustrate that if only the boundaries of the zones are needed (and not the whole area of the zone), inspecting the value of the gradient of u (as opposed to that of u) may be more convenient, since one just looks for points where the gradient is (numerically) non-zero. FIG. 7C is a plot illustrating post-processing of the solution in FIG. 7A. In this particular case, a function w is defined as $w_j=1$ if $u_j \geq \delta$ and $w_j=0$ otherwise, where $w_j$ denotes w evaluated at the j-th grid-point (and similarly for $u_j$). A surface plot of w appears in FIG. 7C, which can be used for visualization purposes (it provides a better defined picture of the zone). In an analogous manner, post-processing of the data from the gradient in FIG. 7B was done, with the resulting (post-processed) zone boundary shown in FIG. 7D, which provides a "cleaner" picture. As another example of post-processing, the area covered by the thermal zone can be approximated by summing the areas of the mesh elements associated with the resulting zone. The process is then repeated for each of the ACUs. The labels in FIGS. 7A-C correspond to those in FIG. 3.

FIG. 8 is a diagram illustrating approximate thermal zone boundaries resulting from the application of the present techniques to the example illustrated in FIG. 3. The labels in FIG. 8 correspond to those in FIG. 3. Post-processing of the individual solutions by associating elements of the finite elements mesh to the resulting zone and its boundary allows visualization of the zones and boundaries separately. The area covered by a thermal zone can be approximated by summing the areas of the mesh elements associated with the resulting zone. See, for example, FIG. 9. FIG. 9 is a diagram illustrating superposition of the individually computed thermal zones. FIG. 8 is a superposition of the zone boundaries (i.e., a superposition of the gradient of u), while FIG. 9 is a superposition of the zones (i.e., a superposition of the solution u). The labels in FIG. 9 correspond to those in FIG. 3. FIGS. 8 and 9 illustrate the situation where the zones of influence are determined one at a time and then superimposed, e.g., on the physical representation of the domain. By contrast, FIG. 6 illustrates the situation where multiple zones are determined at once. So FIGS. 6, 7A-D, 8 and 9 all equate to visualization and post-processing of the solution of the individual BVPs.

As described for example in conjunction with the description of step 204 (of FIG. 2), above, one non-exclusive example for creating a grid that contains a plurality of grid-points in the domain involves creating a finite element mesh in the domain. By way of example only, the mesh consists of a set of nodes within the domain (these are the grid-points), as well as triangles (for two-dimensional domains) or tetrahedra (for three-dimensional domains) connecting these nodes. As highlighted above, the triangles (or tetrahedra) are also referred to herein as elements of the mesh. The nodes correspond to (x, y) coordinates in a two-dimensional domain (or (x, y, z) coordinates in a three-dimensional domain). An example of a finite element mesh is shown illustrated in FIG. 10. Namely, FIG. 10 is a diagram illustrating an exemplary finite element mesh 1000 that includes a set of nine nodes and eight elements in a two-dimensional domain. A key to each of the eight elements E and the corresponding nodes is provided to the right of the mesh.

Figure 11:
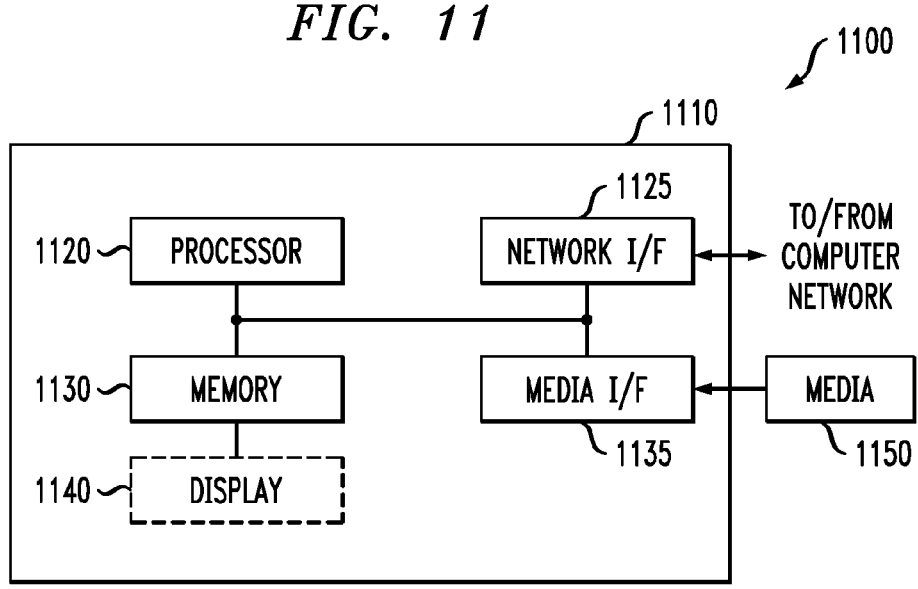
FIG. 11 is a diagram illustrating an exemplary apparatus for modeling zones of influence in a domain according to an embodiment of the present invention.

Turning now to FIG. 11, a block diagram is shown of an apparatus 1100 for modeling regions in a domain affected by a flow of a quantity, in accordance with one embodiment of the present invention. It should be understood that apparatus 1100 represents one embodiment for implementing methodology 200 of FIG. 2.

Apparatus 1100 comprises a computer system 1110 and removable media 1150. Computer system 1110 comprises a processor device 1120, a network interface 1125, a memory 1130, a media interface 1135 and an optional display 1140. Network interface 1125 allows computer system 1110 to connect to a network, while media interface 1135 allows computer system 1110 to interact with media, such as a hard drive or removable media 1150.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to provide a physical representation of the domain; create a grid that contains a plurality of grid-points in the domain; identify sources in the domain; given a vector field that defines a direction of flow of the quantity within the domain, define a boundary value problem for each of one or more of the sources identified in the domain; solve each of the boundary value problems numerically to obtain a solution for the boundary value problems at each of the grid-points; and post-process the boundary value problem solutions to model the regions affected by the flow of the quantity on the physical representation of the domain.

The machine-readable medium may be a recordable medium (e.g., floppy disks, hard drive, optical disks such as removable media 1150, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1120 can be configured to implement the methods, steps, and functions disclosed herein. The memory 1130 could be distributed or local and the processor 1120 could be distributed or singular. The memory 1130 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1120. With this definition, information on a network, accessible through network interface 1125, is still within memory 1130 because the processor device 1120 can retrieve the information from the network. It should be noted that each distributed processor that makes up processor device 1120 generally contains its own addressable memory space. It should also be noted that some or all of computer system 1110 can be incorporated into an application-specific or general-use integrated circuit.

Optional video display 1140 is any type of video display suitable for interacting with a human user of apparatus 1100. Generally, video display 1140 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for modeling regions in a domain affected by a flow of a quantity, comprising the steps of:
   providing a physical representation of the domain;
   creating a grid that contains a plurality of grid-points in the domain;
   identifying sources in the domain;
   given a vector field that defines a direction of flow of the quantity within the domain, defining a boundary value problem for each of one or more of the sources identified in the domain;
   setting a cutoff value for each of the boundary problems;
   solving each of the boundary value problems numerically to obtain a solution for the boundary value problems at each of the grid-points, wherein a given one of the grid-points is within one of the regions affected by the flow of the quantity when the solution for the boundary value problems at the given grid-point is greater than or equal to the cutoff value; and post-processing the boundary value problem solutions to model the regions affected by the flow of the quantity on the physical representation of the domain and thus whereby the boundary value problems are used to identify boundaries of the regions, and thereby the regions themselves in the domain, affected by the flow of the quantity.

2. The method of claim 1, wherein the quantity comprises a gas, a liquid or an electric current.

3. The method of claim 1, further comprising the step of: solving each of the boundary value problems individually.

4. The method of claim 1, wherein the domain is defined by the dimensions of a sub-floor plenum of a data center.

5. The method of claim 4, wherein the regions in the sub-floor plenum affected by the flow of air are modeled.

6. The method of claim 4, wherein the data center comprises computer equipment racks and a raised floor cooling system with one or more computer air conditioning units configured to take in hot air from the computer equipment racks and to exhaust cooled air into the sub-floor plenum that is delivered to the computer equipment racks through a plurality of perforated tiles in the raised floor.

7. The method of claim 6, wherein the perforated tiles comprise air flow sinks and the air conditioning units comprise air sources.

8. The method of claim 1, wherein the boundary value problem is defined as:

$$\gamma v \cdot \nabla u - \epsilon \nabla^2 u = 0 \text{ in } \Omega$$

$$u = g \text{ on } \partial\Omega,$$

wherein u is an unknown function, v is a vector field, $\gamma$ is a positive constant, $\epsilon$ is a non-negative constant, $\Omega$ is a solution domain of a partial differential equation, $\partial\Omega$ is a boundary of $\Omega$, and g is a function prescribing a value of u on the boundary $\partial\Omega$, wherein g in the boundary value problem is defined as $g_k=1$ if k corresponds to a given one of the grid-points that falls on a boundary of an i-th one of the sources, and $g_k=0$ if k corresponds to a given one of the grid-points that falls on the boundary of a remaining one of the sources and wherein at points falling on other domain boundaries, $n \cdot \nabla u = 0$ is imposed, wherein n denotes an outward unit normal vector at a point on the boundary.

9. The method of claim 1, further comprising the steps of: identifying sinks in the domain; and
obtaining flow measurements of the quantity from one or more of the sources and sinks.

10. The method of claim 9, wherein the flow measurements comprise air flow measurements and wherein the air flow measurements from one or more of the sources and sinks are obtained using mobile measurement technology.

11. The method of claim 9, further comprising the step of: determining the vector field using the flow measurement obtained from the sources and sinks.

12. The method of claim 1, wherein the step of post-processing the boundary value problem solutions comprises the step of:
plotting the boundary value problem solutions on the physical representation of the domain to visualize the regions affected by the flow of the quantity.

13. An article of manufacture for modeling regions in a domain affected by a flow of a quantity, comprising a non-transitory machine-readable recordable medium containing one or more programs which when executed implement the steps of:

providing a physical representation of the domain;
creating a grid that contains a plurality of grid-points in the domain;
identifying sources in the domain;
given a vector field that defines a direction of flow of the quantity within the domain, defining a boundary value problem for each of one or more of the sources identified in the domain;
setting a cutoff value for each of the boundary problems;
solving each of the boundary value problems numerically to obtain a solution for the boundary value problems at each of the grid-points, wherein a given one of the grid-points is within one of the regions affected by the flow of the quantity when the solution for the boundary value problems at the given grid-point is greater than or equal to the cutoff value; and
post-processing the boundary value problem solutions to model the regions affected by the flow of the quantity on the physical representation of the domain and thus whereby the boundary value problems are used to identify boundaries of the regions, and thereby the regions themselves in the domain, affected by the flow of the quantity.

14. The article of manufacture of claim 13, wherein the boundary value problem is defined as:

$$\gamma v \cdot \nabla u - \epsilon \nabla^2 u = 0 \text{ in } \Omega$$

$$u = g \text{ on } \partial\Omega,$$

wherein u is an unknown function, v is a vector field, $\gamma$ is a positive constant, $\epsilon$ is a non-negative constant, $\Omega$ is a solution domain of a partial differential equation, $\partial\Omega$ is a boundary of $\Omega$, and g is a function prescribing a value of u on the boundary $\partial\Omega$, wherein g in the boundary value problem is defined as $g_k=1$ if k corresponds to a given one of the grid-points that falls on a boundary of an i-th one of the sources, and $g_k=0$ if k corresponds to a given one of the grid-points that falls on the boundary of another one of the sources and wherein at points falling on other domain boundaries, $n \cdot \nabla u = 0$ is imposed, wherein n denotes an outward unit normal vector at a point on the boundary.

15. An apparatus for modeling regions in a domain affected by a flow of a quantity, the apparatus comprising:
a memory; and
at least one processor device, coupled to the memory, operative to:
provide a physical representation of the domain;
create a grid that contains a plurality of grid-points in the domain;
identify sources in the domain;
given a vector field that defines a direction of flow of the quantity within the domain, define a boundary value problem for each of one or more of the sources identified in the domain;
set a cutoff value for each of the boundary problems;
solve each of the boundary value problems numerically to obtain a solution for the boundary value problems at each of the grid-points, wherein a given one of the grid-points is within one of the regions affected by the flow of the quantity when the solution for the boundary value problems at the given grid-point is greater than or equal to the cutoff value; and post-process the boundary value problem solutions to model the regions affected by the flow of the quantity on the physical representation of the domain and thus whereby the boundary value problems are used to identify boundaries of the regions, and thereby the regions themselves in the domain, affected by the flow of the quantity.

16. The apparatus of claim 15, wherein the boundary value problem is defined as:

$$\gamma v \cdot \nabla u - \epsilon \nabla^2 u = 0 \text{ in } \Omega$$

$$u = g \text{ on } \partial\Omega$$

wherein u is an unknown function, v is a vector field, $\gamma$ is a positive constant, $\epsilon$ is a non-negative constant, $\Omega$ is a solution domain of a partial differential equation, $\partial\Omega$ is a boundary of $\Omega$, and g is a function prescribing a value of u on the boundary $\partial\Omega$, wherein g in the boundary value problem is defined as $g_k=1$ if k corresponds to a given one of the grid-points that falls on a boundary of an i-th one of the sources, and $g_k=0$ if k corresponds to a given one of the grid-points that falls on the boundary of another one of the sources and wherein at points falling on other domain boundaries, $n \cdot \nabla u = 0$ is imposed, wherein n denotes an outward unit normal vector at a point on the boundary.

17. The method of claim 1, wherein the physical representation of the domain is a two-dimensional representation of the domain that comprises a layout of one or more assets in the domain.

\* \* \* \* \*